United States Patent
Kothekar et al.

(10) Patent No.: US 11,785,052 B2
(45) Date of Patent: Oct. 10, 2023

(54) INCIDENT RESPONSE PLAN BASED ON INDICATORS OF COMPROMISE

(71) Applicant: International Business Machines Corporation, Armonk, NY (US)

(72) Inventors: Aditya Vinayak Kothekar, Arlington, MA (US); Kenneth Allen Rogers, Stow, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/188,281

(22) Filed: Jun. 21, 2016

(65) Prior Publication Data
US 2017/0366582 A1 Dec. 21, 2017

(51) Int. Cl.
H04L 9/00 (2022.01)
H04L 29/06 (2006.01)
H04L 9/40 (2022.01)

(52) U.S. Cl.
CPC .......... *H04L 63/205* (2013.01); *H04L 63/101* (2013.01); *H04L 63/1425* (2013.01)

(58) Field of Classification Search
CPC .................... H04L 63/205; H04L 63/1425
See application file for complete search history.

(56) References Cited

U.S. PATENT DOCUMENTS

| | | |
|---|---|---|
| 6,678,827 B1 | 1/2004 | Rothermel et al. |
| 7,376,969 B1 | 5/2008 | Njemanze et al. |
| 7,877,804 B2 | 1/2011 | Khanolkar et al. |
| 8,032,557 B1 | 10/2011 | Vijendra et al. |
| 8,244,777 B1 | 8/2012 | Vijendra et al. |
| 8,661,062 B1 | 2/2014 | Jamail et al. |
| 8,707,445 B2 | 4/2014 | Sher-Jan et al. |
| 8,763,133 B2 | 6/2014 | Sher-Jan et al. |

(Continued)

OTHER PUBLICATIONS

U.S. Appl. No. 14/839,304, filed Aug. 28, 2015, entitled "Incident Response Bus for Data Security Incidents." Specification and drawings, twenty-four pages.

(Continued)

*Primary Examiner* — Daniel B Potratz
*Assistant Examiner* — Syed M Ahsan
(74) *Attorney, Agent, or Firm* — Jeffrey S. LaBaw; David H. Judson

(57) ABSTRACT

A system and method for responding to incidents in an enterprise network is disclosed. The system tracks incidents by creating, in an incident Manager, incident objects for each incident. Each incident object includes details for the incidents, also known as incident characteristics. The system also creates one or more indicators of compromise (IOCs) associated with the incident characteristics for each incident. When processing a new incident or an update to an incident, the system compares IOCs associated with the incident object for the incident being processed to stored IOCs for other incidents to determine if other incidents are related to the incident being processed. In embodiments, the system can then generate tasks for responding to new incidents based on incident characteristics of and IOCs associated with the new incidents, and can regenerate tasks for responding to incidents based on updates to incident characteristics of and IOCs associated with the incidents.

11 Claims, 10 Drawing Sheets

(56) References Cited

U.S. PATENT DOCUMENTS

| | | | |
|---|---|---|---|
| 8,782,784 B1 | 7/2014 | Bruskin | |
| 8,880,682 B2 | 11/2014 | Bishop et al. | |
| 9,069,930 B1 | 6/2015 | Hart | |
| 9,075,668 B1 | 7/2015 | Hushon et al. | |
| 9,083,734 B1 | 7/2015 | Bishop et al. | |
| 9,152,706 B1 | 10/2015 | Claudatos et al. | |
| 9,215,270 B2 | 12/2015 | Mohaban et al. | |
| 9,258,321 B2 | 2/2016 | Amsler et al. | |
| 9,697,352 B1* | 7/2017 | Armstrong | G06F 21/50 |
| 9,747,446 B1* | 8/2017 | Pidathala | G06F 21/56 |
| 2009/0259513 A1* | 10/2009 | Tung | G06Q 10/0633 |
| | | | 705/28 |
| 2013/0124223 A1 | 5/2013 | Gregg | |
| 2013/0332590 A1 | 12/2013 | Mohaban et al. | |
| 2014/0278664 A1 | 9/2014 | Loomis | |
| 2014/0304822 A1 | 10/2014 | Sher-Jan et al. | |
| 2015/0113663 A1 | 4/2015 | Sher-Jan et al. | |
| 2015/0235164 A1 | 8/2015 | Key | |
| 2015/0242625 A1 | 8/2015 | Cassidy et al. | |
| 2015/0365438 A1* | 12/2015 | Carver | H04L 63/1441 |
| | | | 726/1 |
| 2016/0021133 A1 | 1/2016 | Sher-Jan et al. | |
| 2016/0057167 A1* | 2/2016 | Bach | H04L 63/101 |
| | | | 726/23 |
| 2016/0072836 A1* | 3/2016 | Hadden | H04L 63/1441 |
| | | | 726/23 |
| 2016/0080413 A1* | 3/2016 | Smith | H04L 63/1458 |
| | | | 726/23 |
| 2016/0127394 A1 | 5/2016 | Hadden et al. | |

OTHER PUBLICATIONS

U.S. Appl. No. 14/981,266, filed Dec. 28, 2015, entitled "Data Security Incident Correlation and Dissemination System and Method." Specification and drawings, twenty-five pages.

BlackStratus SIEMStorm, "Rapidly identify and resolve threats, . . . " www.blackstratus.com, 2012. Four pages.

Domino Project Management, "Track and Control Projects with Lotus Notes," www.trackersuite.com/index, 2013. Two pages.

HP ArcSight Express, "World-Class Protection for the Mid-Size Organization," www.arcsight.com, 2010. Six pages.

Janet Csirt, "RTIR incident handling work-flow," Janet (UK) WI/JCSIRT/002, jisc.ac.uk, 2011. Eighteen pages.

Jarocki, J., "Orion Incident Response Live CD," 2010, Sans Institute, https://www.sans.org. Forty-five pages.

Khurana, H. et al., "Palantir: A Framework for Collaborative Incident Response and Investigation," IDtrust, 2009. Fourteen pages.

QRadar Administration Guide, http://www.q1labs.com, May 2012. 318 pages.

QRadar Users Guide, http://www.q1labs.com, May 2012. 396 pages.

Reddy, K. et al., "The architecture of a digital forensic readiness management system," Computers & Security 32 (2013) 73-89. Seventeen pages.

Swift, D., "A Practical Application of SIM/SEM/SIEM Automating Threat Identification," 2006, SANS Institute 2007. Forty-one pages.

West-Brown, M. et al., "Handbook for Computer Security Incident Response Teams (CSIRTs)," 2nd Edition, Apr. 2003. 223 pages.

* cited by examiner

INCIDENT RESPONSE PLAN BASED ON INDICATORS OF COMPROMISE

BACKGROUND OF THE INVENTION

A data security incident is a general term associated with many different types of unauthorized activity involving devices, networks, and/or sensitive data. The unauthorized activity typically occurs on an enterprise network. Examples of devices include computing devices such as desktops, laptops, mobile phones, other mobile computing devices, servers such as file, application and authentication servers, and networking devices such as routers and firewalls. Examples of data security incidents include lost or stolen computing devices, devices compromised by malware or accessed without authorization, and internet based cyber attacks.

Data security incidents pose a major security, operational and financial risk for business. Data security incidents such as cyber attacks are often designed to disrupt normal business operations and to steal information. Attacks that disrupt business operations include introduction of malware, computer viruses, and Denial of Service (DoS) attacks. The intrusion attempts use various methods to gain unauthorized access to personal information of individuals, and company confidential information such as customer lists and business plans. Attackers use methods that target security vulnerabilities in computer operating systems and software within the business' enterprise network to obtain unauthorized access.

Organizations, such as businesses, often utilize Security information and Event Manager (SIEM) systems to assist in the detection and reporting of incidents. SIEMs, in examples, can automatically detect many different types of data security incidents that occur on devices within a business' enterprise network, and can log events in response. The event logs stored by the SIEMs can then be analyzed to determine incident trends and changes to incidents over time. As a result, SIEMs can complement the efforts of incident responders for identifying and characterizing incidents.

The organizations will also sometimes use incident management systems or managers (IMs) to track and recommend responses to data security incidents (incidents) and track the workflow associated with dealing with those incidents in their enterprise computer networks. However, traditional incident management systems and methods typically cannot identify trends among and relationships between different types of incidents over time and typically cannot improve upon responses to future incidents based upon responses to prior incidents in an automated and structured fashion. In addition, these systems also typically require manual creation of tasks for responding to the incidents. Incident response team (IRT) personnel, also known as incident responders, typically create these tasks as steps to execute among the devices within the enterprise network for responding to the incidents.

New incident management systems have been proposed to overcome the limitations of traditional incident management systems. Examples include: "System for Tracking Data. Security Threats and Method for Same," US Pat. Pub. No. US2016/0072836A1 ('836), published Mar. 10, 2016 by Allen Hadden and Kenneth Rogers, "Data Security Incident Correlation and Dissemination System and Method," U.S. patent application Ser. No. 14/981,266, filed Dec. 28, 2015 by Allen Hadden and Kenneth Rogers, "Action Response Framework for Data Security Incidents," US Pat. Pub. No. US2016/0127394A1, published May 5, 2016 by Allen Hadden and Kenneth Rogers, and "Incident Response Bus for Data Security Incidents," U.S. patent application Ser. No. 14/839,304, filed Aug. 28, 2015 by Allen Hadden and Kenneth Rogers. These applications are incorporated by reference in their entirety.

While IRT personnel can manually create the incident objects for each incident and enter the incident details for each incident, these IMs can also automatically create the incident objects and include the incident details within the incident objects. The details for each incident include characteristics for each incident, such as the time of occurrence, incident type, data compromise status, and devices affected, in examples. For this reason, incident details of incidents are also known as incident characteristics.

The IM can also automatically identify and create incident artifacts associated with each incident, which are also known as indicators of Compromise (IOCs). Indicators of compromise include information associated with devices within an enterprise and/or data traffic of the devices, where the information suggests attempted or actual intrusions upon the devices. Each IOC can be associated with one or more incidents. Because incident objects are created for tracking each incident, IOCs are associated with the incident objects for incidents.

IOCs are stored separately from their associated incident objects, and are often linked to/associated with multiple incidents. The IMs and/or the incident responders routinely update the incident characteristics for the incident Objects and/or IOCs associated with each incident object, in response to improved threat intelligence for and experience with the incidents. The IM can then correlate the incident objects and associated IOCs for the incidents to determine potential trends and threats among incidents, and generate a list of tasks for responding to each incident. Tasks are instructions to the incident responders to perform a specific action which may, in turn, execute a script and/or an automated system process such as a Remote Procedure Call (RPC) for carrying out actions on devices within a client's enterprise network.

SUMMARY OF THE INVENTION

The IMs will execute a number of operations as each new incident is detected, using an incident object-driven approach. In the case of new incidents, the IM either automatically creates an incident object for each incident, or creates the incident object in response to manual input from an incident responder. The IM determines any incidents that may be related to the new incident by comparing their incident objects. The IM then generates tasks for responding to the new incident based on the incident characteristics of the new incident object, and based upon the incident characteristics of any other incident objects the IM has determined are related to the new incident.

However, the incident characteristics for new incidents are based on possibly incomplete or preliminary information available at the time the incident is first detected. As a result, any tasks generated for responding to such an incident will correspondingly be initially incomplete in nature or perhaps incorrect in some aspects. In one example, an incident initially characterized as type "phishing," which utilizes deception to coax potential victims into voluntarily providing personal or sensitive information, will require updates once an incident responder determines over time that the incident is more of a "hacking" attack, where malicious software attempts to extract the same information from its victims in an involuntary fashion. As a result, any tasks generated for responding to the incident, which are generated from the incident characteristics within the incident object for the incident, will likely not provide the most efficient or correct response to the incident.

Also, incident management systems will typically not regenerate the tasks for responding to the incidents in response to updates to the IOCs associated with the incidents. This is important because the changing state or nature of IOCs can affect the state or nature of the incident objects associated with the IOCs, and therefore can change the nature of the incidents themselves. In one example, an IOC for a specific IP address can "age out" over time and become temporally irrelevant. As a result, any incident objects for incidents that are associated solely with this IOC can be updated to indicate that the incident is no longer a threat, and could even be deleted from the IM. However, the incident responders would have to manually update (or delete) the tasks providing the incident response for the incident response.

The present invention provides an IOC-driven approach for responding to incidents. For a new incident, in addition to generating tasks for responding to the new incident based on the incident characteristics of the new incident, the IM of the present invention can also generate tasks for responding to the new incident based on upon the one or more IOCs associated with the incident object for the new incident. Also, for an existing incident, in addition to generating tasks for responding to the existing incident based on updated incident characteristics of the existing incident, the IM of the present invention can also generate tasks for responding to the existing incident based updates to the IOCs associated with the incident.

In general, according to one aspect, the invention features a method for responding to data security incidents in an enterprise network. The method includes creating, in an incident manager (IM), incident objects for data security incidents, wherein each incident object includes incident characteristics. The method also includes creating, in the IM, one or more indicators of compromise (IOC) associated with the incident objects.

In addition, the method also includes determining tasks for incident objects based upon the incident characteristics of the incident objects, determining tasks for incident objects based upon the one or more IOCs associated with the incident objects, and generating incident response plans for the data security incidents. The incident response plans include the tasks based upon the incident characteristics of the incident objects, and include any tasks based upon the one or more IOCs associated with the incident objects.

In one example, determining the tasks for incident objects based upon the one or more IOCs associated with the incident objects comprises comparing the IOCs associated with the incident objects for the data security incidents to IOCs associated with incident objects for other data security incidents stored within the IM, to determine any common IOCs and/or common groupings of IOCs. In addition, determining the tasks for incident objects based upon the one or more IOCs associated with the incident objects comprises identifying incident objects associated with the common IOCs and/or common groupings of IOCs as a set of correlated incident objects, determining whether there are any common incident characteristics among the set of correlated incident objects, and creating tasks based upon the common incident characteristics among the set of correlated incident objects.

In another example, determining whether there are any common incident characteristics among the set of correlated incident objects comprises loading statistical analysis algorithms for analyzing the incident characteristics of the set of correlated incident objects, and executing the statistical analysis algorithms against the incident characteristics of the incident objects within the set of correlated incident objects. The method additionally executes the tasks included in the incident response plans for the data security incidents to respond to the data security incidents.

In embodiments, a Security Information and Event Manager (SIEM) of the enterprise network includes the incident characteristics of the incident objects and the one or more IOCs associated with the incident objects within messages. The SIEM sends the messages to the IM, and the IM creates the incident objects, the incident characteristics of the incident objects, and the one or more IOCs associated with the incident objects in response to receiving the messages.

In general, according to another aspect, the invention features a method for responding to data security incidents in an enterprise network. The method includes creating, in an incident manager (IM), incident objects for data security incidents, wherein the incident objects include incident characteristics. The method also includes storing, in the IM, one or more indicators of compromise (IOC) associated with the incident objects, creating tasks for incident objects based upon the incident characteristics of the incident objects, and generating incident response plans for the data security incidents that include the tasks based upon the incident characteristics of the incident objects.

In addition, in response to receiving updated incident characteristics for the incident objects, the method can create tasks based on the updated incident characteristics for the incident objects, and can generate the incident response plans for the data security incidents to include the tasks based on the updated incident characteristics for the incident objects.

In one example, the method creates tasks for the incident objects based upon the one or more IOCs associated with the incident objects, and regenerates the incident response plans to additionally include the tasks based upon the one or more IOCs associated with the incident objects. In another example, the method creates tasks for the incident objects based upon updates to the one or more IOCs associated with the incident objects, and regenerates the incident response plans to additionally include the tasks based upon the updates to the one or more IOCs associated with the incident objects.

Preferably, the method creates tasks for the incident objects based upon the updates to the one or more IOCs associated with the incident objects by: comparing the updated IOCs associated with the incident objects for the data security incidents, to IOCs associated with incident objects for other data security incidents stored within the IM, to determine any common IOCs and/or common groupings of IOCs; identifying incident objects associated with the common IOCs and/or common groupings of IOCs as a set of correlated incident objects; determining whether there are any common incident characteristics among the set of correlated incident objects; and creating tasks based upon the common incident characteristics among the set of correlated incident objects.

In general, according to yet another aspect, the invention features a system for responding to data security incidents. The system includes an incident manager (IM) that creates incident objects for data security incidents, herein the incident objects include incident characteristics. The IM also creates one or more indicators of compromise (IOC) associated with the incident objects. The system also includes a rules engine of the IM.

The rules engine preferably creates tasks for the incident objects based upon the incident characteristics of the incident objects, determines tasks for the incident objects based upon the one or more IOCs associated with the incident objects, and generates incident response plans for the data security incidents. The incident response plans for the data security incidents include the tasks based upon the incident characteristics of the incident objects, and include the tasks based upon the one or more IOCs associated with the incident objects.

In yet another example, the IM further includes an inference engine. The inference engine compares the IOCs associated with the incident objects for the data security incidents, to IOCs associated with incident objects for other data security incidents stored within the IM, to determine any common IOCs and/or common groupings of IOCs. The inference engine also identifies incident objects associated with the common IOCs and/or common groupings of IOCs as a set of correlated incident objects, determines whether there are any common incident characteristics among the set of correlated incident objects; and sends the common incident characteristics to the rules engine. The rules engine then determines the tasks for each incident object based upon the one or more IOCs associated with each incident object in response to receiving the common incident characteristics from the inference engine.

The IM also includes statistical analysis algorithms. Preferably, the inference engine downloads the statistical analysis algorithms from the IM and applies the statistical analysis algorithms to the set of correlated incident objects to determine whether there are any common incident characteristics among the set of correlated incident objects.

In general, according to still another aspect, the invention features a system for responding to data security incidents. The system includes an incident manager (IM) that creates incident objects for data security incidents, wherein the incident objects include incident characteristics. The IM also creates one or more indicators of compromise (IOC) associated with the incident objects. The system also includes a rules engine of the IM.

The rules engine creates tasks for the incident objects based upon the incident characteristics of the incident objects, and generates incident response plans for the data security incidents. The incident response plans include the tasks based upon the incident characteristics of the incident objects. The rules engine additionally receives updated incident characteristics for the incident objects, and in response, determines tasks based on the updated incident characteristics for the incident objects, and regenerates the incident response plans for the data security incidents to include the tasks based on the updated incident characteristics.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
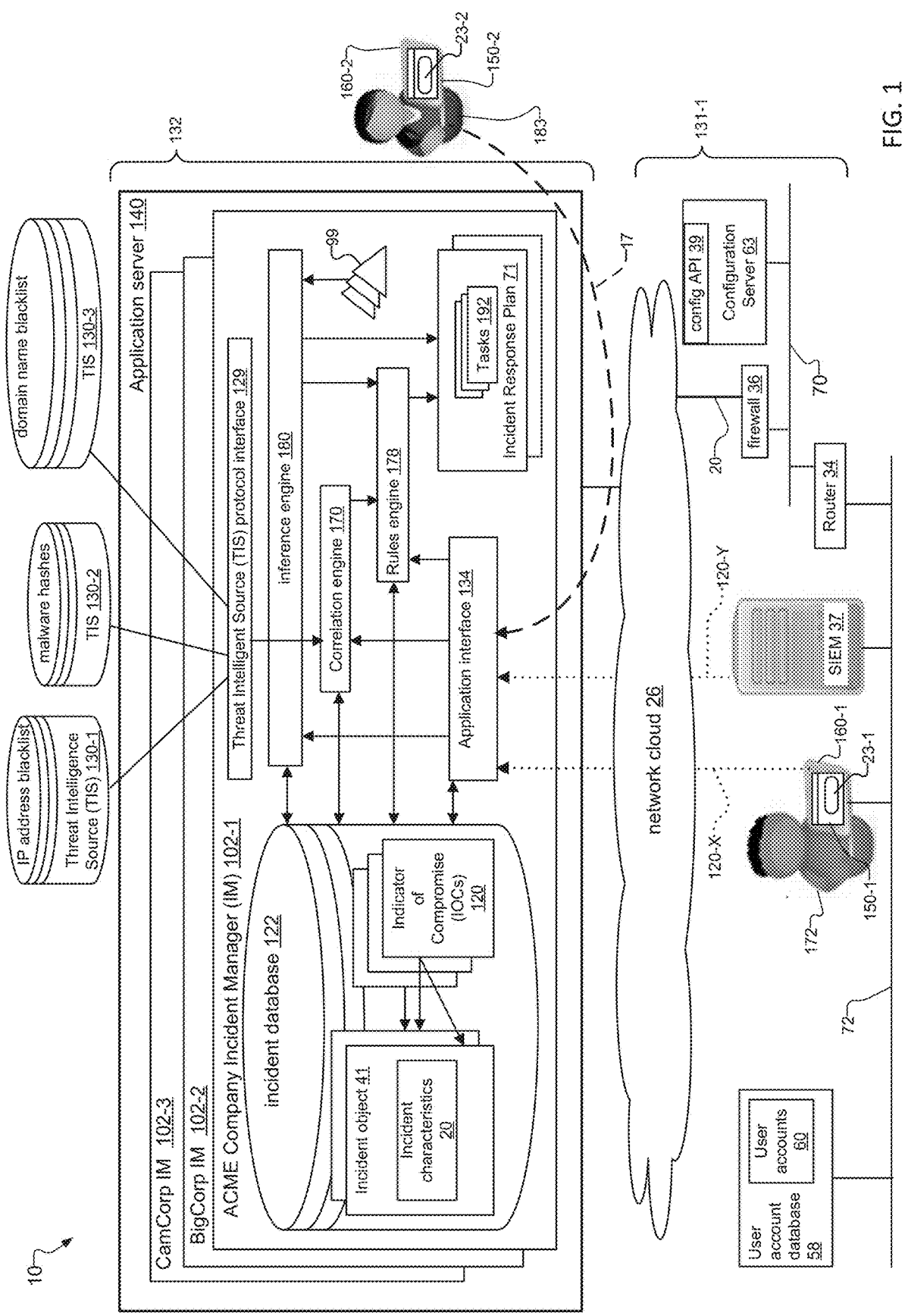
FIG. 1 is a schematic diagram of an incident management system deployed on a remote service network that includes an incident manager (IM) to which the present invention relates, where each IM is associated with a separate client enterprise network and tracks data security incidents by storing and updating incident objects within the IM for the data security incidents, and where each IM provides an incident response plan for responding to each new data security incident based on information concerning each data security incident such as incident characteristics and indicators of compromise (IOC) associated with each data security incident, and where each IM updates the incident response plan for existing data security incidents in response to updates to the information concerning the data security incidents.

FIG. 1 shows a cloud embodiment of one or more incident manager collaboration tool applications (IM) 102 within an incident management system 10. Preferably, an IM 102 is implemented as an internet-accessible managed service such as a Software as a Service (SaaS) application. The IMs 102 are hosted within an application server 140. The application server 140 is included within a service network 132.

IMs 102-1, 102-2, and 102-3 manage the incident response for enterprise networks 131 of exemplary organizations: ACME Company, BigCorp, and CamCorp, respectively. The enterprise network 131 of ACME Company is shown. The application server 140 provides security and mutual exclusion of the data for each IM 102. Each IM 102 communicates with its associated enterprise network 131 over a network cloud 26.

The enterprise network 131 of each organization includes a number of devices. These include computing devices, database systems, and data networking devices such as routers 34, firewalls 36 and configuration servers 63, in examples. The enterprise network 131 typically connects to the network cloud 26 via a firewall 36 device. The firewall 36 typically provides a single point of connection for each organization's enterprise network 131 to the network cloud 26. The network cloud 26 can be a private network, or a public network such as the Internet, in examples.

In one example, the configuration server 63 includes a config API 39 that enables an external client such as the TM 102 to execute actions on devices within the client's enterprise network 131. Preferably, via its config API 39, the configuration server 63 acts as a proxy for the IM 102 to execute actions on remote devices in the enterprise networks 131 of the clients.

In the example enterprise network 131 for ACME Company, the firewall 36 also typically connects to a corporate network 70 of the enterprise network 131. A router 34 connects the corporate network 70 to a local network 72. The local network 72 also includes devices such as a user account database 58 including user accounts 60, and a security information and event manager (SIEM) 37.

Incident responders 172 access the IM 102 via a browser 150-1 on a user device 160-1 such as a workstation, laptop, mobile phone, or other mobile computing device. The browser 150-1, in one example, presents a graphical user interface (GUI) application 23-1, or "app" for managing and interacting with the IM 102. In one example, the application server 140 can additionally function as a web server for the browser 150-1. In other examples, the app 23-1 can execute in a stand-alone fashion on the user device 160-1 without the use of a browser 150-1.

In response to incidents detected within each company's enterprise network 131, incident characteristics 20 of the incidents are typically sent via the firewall 36 of each company's enterprise network 131. The IM 102 creates an incident object 41 for each incident, where each incident object 41 also includes the incident characteristics 20 of each incident. In addition, the incident responders 172 and/or the SIEM 37 can create the incident characteristics 20 within each incident object 41. Example incident object types include Denial of Service, Phishing, Malware, and System Intrusion.

The IM 102 includes an application interface 134 that provides access to the IM 102 for users such as the incident responders 172. The IM 102 also includes an incident database 122 that stores incident objects 41 and indicators of compromise (IOCs) 120 associated with one or more incident objects 41, a correlation engine 170, an inference engine 180, and a rules engine 178 that includes rules. The IM 102 also includes a Threat Intelligence Source (TIS) protocol interface 129 and one or more statistical analysis algorithms 99.

Examples of IOCs 120 include "known bad" IP addresses included in messages sent from known email spammers, fully-qualified domain names (FQDN) of suspected malware websites, and unique hash values associated with different computer viruses and other malware, in examples. Like incident objects 41, IOCs 120 are associated with common behaviors or types. For this reason, as with incident objects, IOCs are also typically identified by their type. In examples, IOC types include: Domain Name Service (DNS)/Domain Name, Email Attachment, Email Attachment Name, Email Body, Email Recipient, Email Sender Address, Email Destination Address, Email Sender Name, Email Subject, File Name, File Path, HTTP Request Header, HTTP Response Header, IP address, IP Address Log File, MAC Address, Malware Family/Variant, Malware MD5 Hash, Malware SHA-1 Hash, Malware SHA-256 Hash, Malware Sample, Malware Sample Fuzzy Hash, Mutex, Network GDR Range, Other File, Password, Protocol Port, Process Name, RFC 822 Email Message File, Registry Key, Service, String, System Name, Threat CVE ID, URI Path, URL, URL Referer, User Account, User Agent, and X509 Certificate File.

Exemplary TISs 130 such as an IP address blacklist TIS 130-1, a malware hash TIS 130-2, and a domain name blacklist TIS 130-3 are accessible to each IM 102 via the TIS protocol interface 129 of each IM 102. The IP address blacklist TISs 130-1 includes IP addresses associated with known threats. The malware hash TISs 130-2 includes hashes/signatures for known malware threats, and the domain name blacklist TIS 130-3 includes fully qualified domain names (FQDN) associated with suspect web sites, in examples. TISs 130 are used by incident responders 172 and/or the IMs 102 to create, update, and augment the contents of indicators of compromise 120, in examples.

The incident database 122 stores incident objects 41 and indicators of compromise 120 for incidents. An incident object 41 is created either automatically by the IM 102, by an incident responder 172, or by the SIEM 37 in response to each incident detected in the enterprise network 131 of each client. The indicators of compromise 120 can have a one-to-many relationship with the incident objects 41 and can be edited/augmented by incident responders 172 or by the IM 102 to include updated and/or new information. For example, when the IM 102 identifies an IP address data resource within a newly created incident object 41, the IM 102 can first search the incident database 122 to determine if an indicator of compromise 120 for the same IP address data resource already exists. If the indicator of compromise 120 already exists, the IM 102 can "link" or associate the existing indicator of compromise 120 with the newly created incident object 41. The IM 102 can then annotate the existing indicator of compromise 120 with information obtained from the newly created incident object 41. Moreover, the fact that the same indicator of compromise 120 is linked with multiple incidents (i.e. linked with multiple incident objects 41) can also be an indicator of a pattern or trend when analyzing incident objects 41 of incidents.

The incident responders 172, the IM 102, and/or the SIEM 37 can also update the contents of incidents of compromise 120 associated with each incident, and can also update the associations between the incidents of compromise 120 and each incident. This is indicated by reference 120-X for incident responders 172 and reference 120-Y for the STEM. In one example, an incident responder 172 receives improved threat intelligence for a denial of service attack incident. The improved intelligence indicates that the separate IP address and FQDN indicators of compromise 120 for the incident are no longer identified as "known bad" resources/entities. In response, an incident responder 172 can then update the contents of the IP address and FQDNs indicators of compromise 120 accordingly. Then, because the updated IP address and FQDNs indicators of compromise 120 are no longer associated with the denial of service incident, the incident responder 172 can also remove the link or association between the updated IP address and FQDNs indicators of compromise 120 and the incident object 41 originally created for the denial of service incident.

The rules engine 178 generates a list of tasks 192 that define responses to data security incidents. The one or more tasks 192 for responding to an incident are included in an incident response plan 71 for each incident. Preferably, the tasks 192 include recommended and/or specific actions that should be taken within each client's enterprise network 131 to provide an incident response to each incident. These actions can be manual in nature, such as recommending that an incident responder 172 quarantine a device infected with malware, or automatic, such as a script for execution by the configuration server 63 to disable ports on the router 34, in another example. Note that the rules engine 178 can also be programmed to automatically execute actions in response to incidents, such as instructing the firewall 36 to block access to certain IP addresses or suspicious protocol ports in response to a data security incident.

The inference engine 180 compares the contents of one or more indicators of compromise 120 associated with a selected incident object 41, to other indicators of compromise 120 stored within the incident database 122. The other indicators of compromise 120, in turn, are associated with different incident objects 41 stored within the incident database 122. The inference engine 180 analyzes the indicators of compromise 120 with the assistance of statistical analysis algorithms 99 that the inference engine 180 loads upon startup of the IM 102.

Security analysts 183 can also access the IMs 102 via the application interface 134 of each IM. This access is indicated by reference 17. Unlike the incident responders 172, who typically create incident objects 41 for detected incidents and carry out incident responses via the tasks 192 within the incident response plan 71 for each incident, the security analysts 183 typically update or "inject" tasks for responding to incidents within the incident response plan 71 for the incident, in one example. As with incident responders 172, the security analysts 183 access the IMs 102 via an app 23-2 executing within a browser 160-2 on In this way, the security analysts 183 can adjust and/or override the responses to incidents provided by the incident response plan 71 and tasks 192 for each incident. As with incident responders 172, the security analysts 183 access the IM 102 using apps 23-2, where the apps 23-2 execute in a stand-alone fashion on the user devices 160-2 or execute within web browsers 150-2 running on the user devices 160-2. The security analysts 183 can also update the contents of the statistical analysis algorithms 99 as part of maintenance operations, or to program the statistical analysis algorithms 99 to modify (e.g. override) the ways in which the algorithms analyze incident characteristics 20 of incident objects 41 and/or IOCs 120 associated with incident objects 41, in examples.

Figure 2:
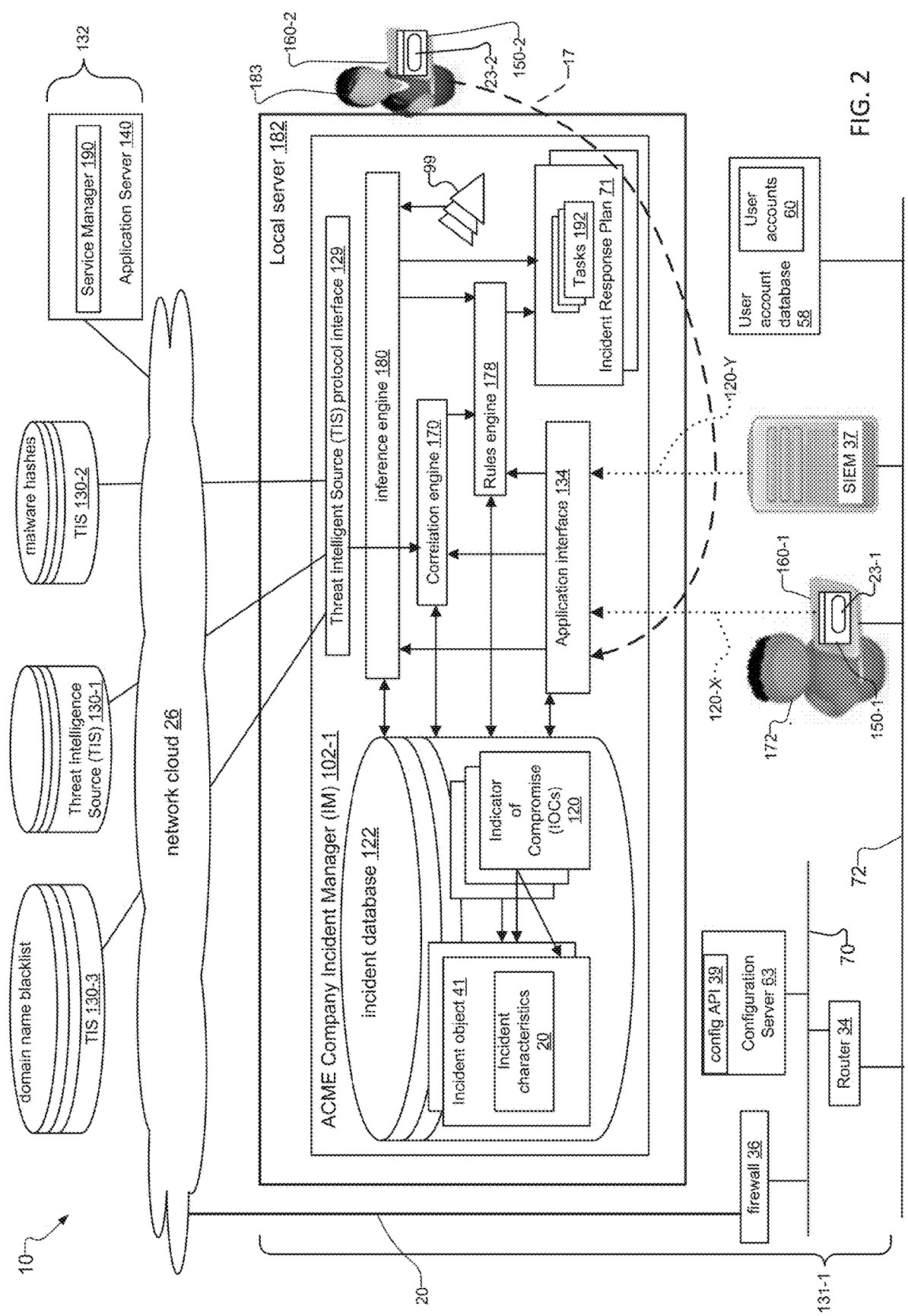
FIG. 2 is a schematic diagram of an incident management system including an on-premises embodiment of an IM, where the IM is included within the client enterprise network for which the IM manages the incident response.

FIG. 2 shows a system diagram of an "on premises" embodiment of an IM 102 within an incident management system 10. Here, the IM 102 is hosted on a local server 182 included within each enterprise network 131 for which the IM 102 tracks the data security incidents. As in FIG. 1, detail for the enterprise network 131-1 of ACME Company is shown.

This embodiment provides local access to the IM 102 for incident responders 172 of the enterprise network 131 of each client. The service network 132 includes an application server 140, which in turn includes a service manager 190 application. The service manager 190 is preferably a lightweight management application or service that monitors the IMs 102 within the enterprise networks 131 of each client company of the service.

Figure 3:
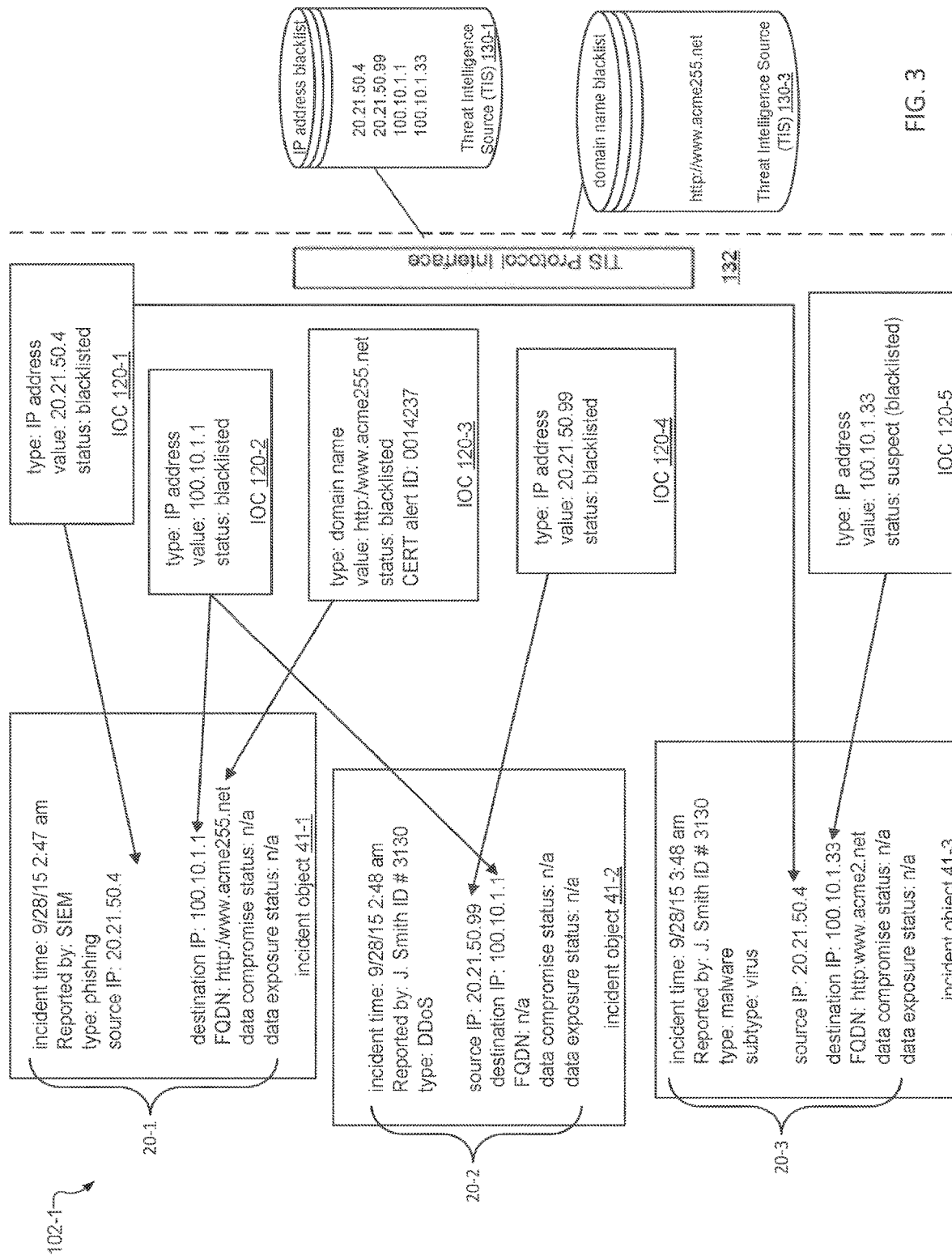
FIG. 3 is a diagram that shows different example incident objects for incidents, where the incident objects include incident characteristics for each incident, and where the diagram also shows indicators of compromise (IOCs) associated with the incident characteristics of the incident objects for illustrating how IOCs and incident objects are related.

FIG. 3 is a diagram that shows relationships between three exemplary incident objects 41-1 through 41-3 and five exemplary indicators of compromise 120-1 through 120-5 within the IM 102-1 for ACME Company. The indicators of compromise 120-1 through 120-5 were created for and are each associated with one or more of the incident objects 41-1 through 41-3. Each of the incident objects 41-1 through 41-3 include incident characteristics 20-1 through 20-3, respectively. In general, the incident characteristics 20 include an incident type, an optional subtype, a time/date stamp indicating the time the incident object 41 was created, a name of the incident responder 172 (or SIEM 37) that reported the incident, data compromise status information, and data exposure status information, in examples. In addition, the incident characteristics 20 often include one or more data resources such as IP addresses, fully-qualified domain name (FQDN) of a website, and unique hash values calculated for files attached to email messages, in examples. Often, IOCs 120 provide more detail for data resources within the incident objects 41.

For illustration purposes, the IM 102-1 starts in an initial state without any incident objects 41 or IOCs 120 associated with incidents stored within the IM 102-1.

In response to a first data security incident, incident object 41-1 is created and includes incident characteristics 20-1 for a likely phishing incident. Relevant incident characteristics 20-1 include an incident type of "phishing," a source IP address of "20.21.50.4," a destination IP address of "100.10.1.1," and a FQDN of "http:/www.acme255.net". To confirm the suspected nature of the incident, the IM 102-1 determines if any indicators of compromise 120 already exist within the IM 102-1 for the specific IP address and FQDN: data resources in the incident characteristics 20-1.

Because no indicators of compromise 120 currently exist for these data resources within the incident database 122, the IM 102-1 executes a lookup of the IP addresses against the IP address blacklist TIS 130-1, and executes a lookup of the FQDN against the domain name blacklist TIS 130-3.

Because the responses to the lookups indicate that the resources are "known bad" or blacklisted resources and are therefore indicators of compromise, the IM 102-1 creates IOC 120-1 for IP address "20.21.50.4," IOC 120-2 for IP address "100.10.1.1," and IOC 120-3 for FQDN "http://www.acme255.net". Then, the IM 102-1 "links" or creates an association between IOCs 120-1, 120-2, and 120-3 and incident object 41-1.

Associations between IOCs 120 and incident characteristics 20 of incident objects 41 are shown via the arrows in FIG. 3. Each arrow points from an IOC 120 towards a specific item of incident characteristics 20 within the incident objects 41. Note that each IOC 120 can be associated with one or more incident objects 41.

In a similar vein, incident object 41-2 is created for a second incident and includes incident characteristics 20-2 for a likely distributed denial of service (DDoS) attack incident. Relevant incident characteristics 20-2 include a type of "DDoS," a source IP address of "20.21.50.99," and a destination IP address of "100.10.1.1". To confirm the suspected nature of the incident, the IM 102-1 determines if any indicators of compromise 120 already exist within the incident database 122 for the specific IP addresses in the incident characteristics 20-2. Because no IOC 120 currently exists for IP address "20.21.50.99," the IM 102-1 executes a lookup of the IP address against the IP address blacklist TIS 130-1. Because the response to the lookup indicates that the resource is a "known bad" or blacklisted resource and is therefore an indicator of compromise, the IM 102-1 creates IOC 120-4 for IP address "20.21.50.99." As for destination IP address "100.10.1.1," the IM 102-1 determines that IOC 120-2 already exists for this IP address. As a result, the IM 102-1 "links" or creates an association between IOCs 120-4, 120-2, and incident object 41-2.

Then, incident object 41-3 is created for a third incident and includes relevant incident characteristics 20-3 for a likely malware attack incident. Relevant incident characteristics 20-3 include a type of "malware," a subtype of "virus," a source IP address of "20.21.50.4," and a destination IP address of "100.10.1.3". Note that an IOC 120 was not created for FQDN "http:www.acme2.net" within the incident characteristics 20-3 of incident object 41-3, because this FQDN is not included as a "known bad" domain name in the domain name blacklist TIS 130-3.

To confirm the suspected nature of the incident, the IM 102-1 determines if any indicators of compromise 120 already exist for the specific IP addresses in the incident characteristics 20-3. Because no IOC 120 exists for IP address "100.10.1.33," the IM 102-1 executes a lookup of the IP address against the IP address blacklist TIS 130-1. Because the response to the lookup indicates that the resource is a "known bad" or blacklisted resource and is therefore an indicator of compromise, the TM 102-1 creates IOC 120-5 for IP address "100.10.1.33." As to source IP address "20.21.50.4," the IM 102-1 determines that IOC 120-1 already exists for this IP address. As a result, the IM 102-1 "links" or creates an association between IOCs 120-5, 120-1, and incident object 41-3.

FIG. 4A-4D show exemplary screens 602-1 through 602-4, respectively, of task information for tasks 192 generated within an IM 102, where the screens 602 are displayed within an app 23 that executes on a user device 160. It can be appreciated that the app 23 provides additional screens 602 for creation and management of other objects associated with the IM 102 in addition to tasks 192, such as for incident objects 41, IOCs 120, tasks 192, incident response plans 71, statistical algorithms 99, and rules in the rules engine 178, in examples.

In each of the screens 602, tasks 192 are organized by task type 193, and lists 29 of tasks 192 are presented for each task type 193. The tasks 192, were generated in response to attacks of types Denial of Service (DoS), Phishing, and Malware that the IM 102 detected within an enterprise network 132.

Figure 4A:
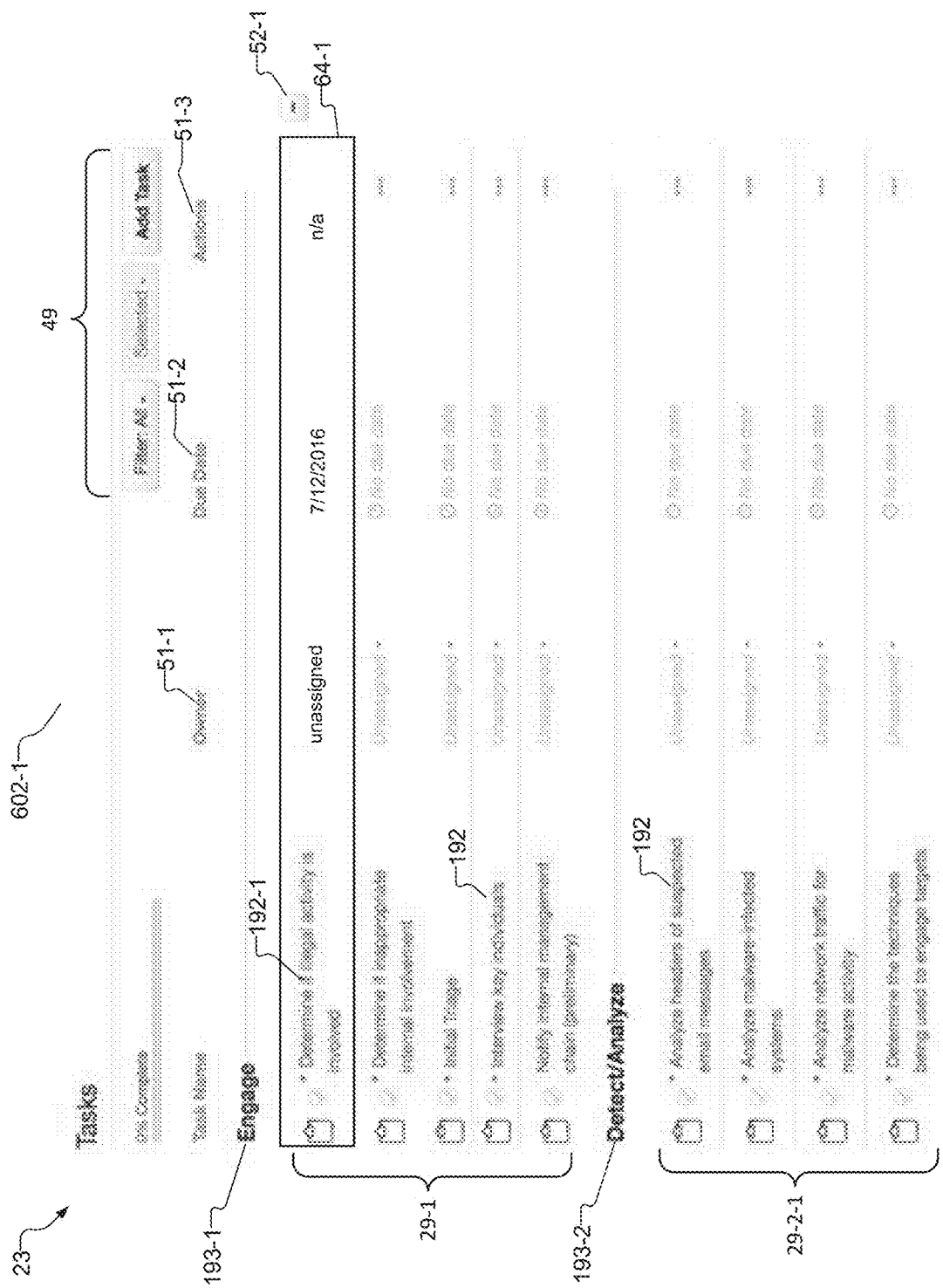
FIG. 4A-4D are exemplary screens of information displayed within an application or "app" executing on a mobile user device, where incident responders utilize the app to manage and configure IMs and their objects, and where FIG. 4A-4D display different examples of tasks generated by the IM and/or configured by incident responders for responding to data security incidents of different types.

In FIG. 4A, screen 602-1 of task information for exemplary tasks of task type Engage 193-1 and Detect/Analyze 193-2 are displayed. The screen 602-1 provides a set of buttons 49 for user creation, selection, and filtering of tasks 192. Attributes 51 of each task 192 include a task owner 51-1, due date 51-2, and actions 51-3 to execute. More than one task 192 can be selected for further management and configuration at a given time. Currently, task 192-1 is selected, indicated by reference 64-1.

For each selected task (here, task 192-1), a task edit button 52-1 is displayed. The task edit button 52-1 enables incident responders 172 and/or security analysts 183 to edit the attributes 51 for each task. In response to selection of the task edit button 52-1, a new window or screen 602 enabling modification of the attributes 51 is displayed. The actions 51-3 that are available for each task 192 are typically specific to each task type 193 and can also be manually configured. For the selected task 192-1, the owner 51-1 is currently unassigned, the due date is Jul. 12, 2016, and its actions 51-3 are "n/a" (not available).

Task type Engage 193-1, as the name implies, seeks incident responders 172 to gather information associated with an incident and make preliminary judgments concerning the nature and scope of an incident from the gathered information. The task list 29-1 for task type Engage 193-1 includes exemplary tasks 192 with the following names/titles: Determine if illegal activity is involved, Determine if inappropriate internal movement, Initial triage, Interview key individuals, Notify internal management chain (preliminary).

Tasks of type Detect/Analyze 193-2 specify analysis operations to execute. These tasks can be carried out manually by incident responders 172 assigned to the tasks 192, or can be executed in an automated fashion by the IM 102. Task list 29-2-1 for task type Detect/Analyze 193-2 includes exemplary tasks 192 with the following names/titles: Analyze headers of suspected email messages, Analyze malware-infected systems, Analyze network traffic for malware activity, and Determine the techniques being used to engage targets.

Figure 4B:
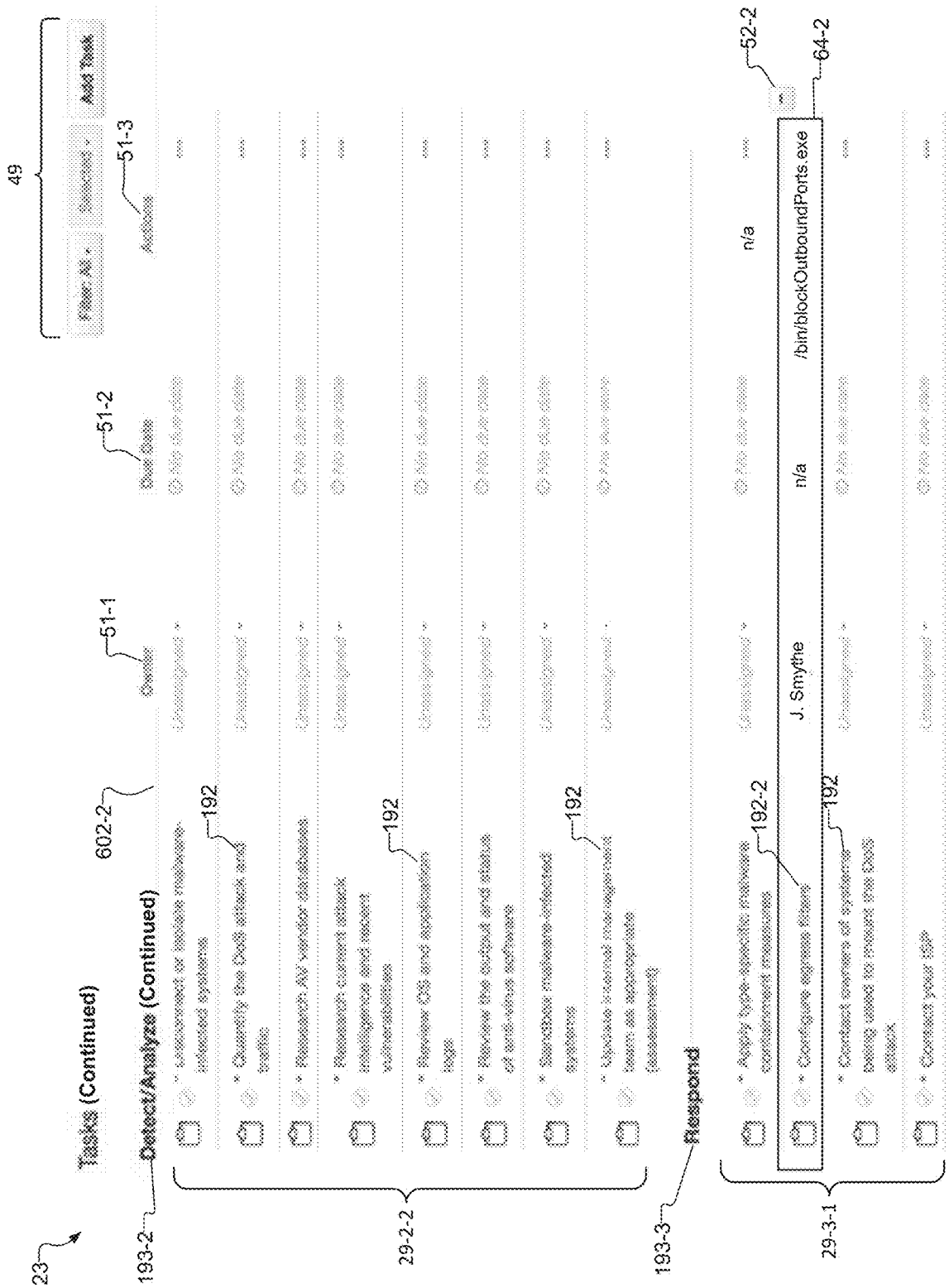

FIG. 4B displays screen 602-2 of task information. Screen 602-2 includes exemplary tasks of task type Detect/Analyze 193-2, continued from FIG. 4A, and exemplary tasks of type Respond 193-3. After incidents are identified and analyzed, tasks of type Respond 193-3 are carried out to remediate harm caused to devices and systems caused by data security incidents, to protect against future harm, and to notify affected parties, in examples.

Task list 29-2-2 for task type Detect/Analyze 193-2 includes exemplary tasks 192 with the following names/titles: Disconnect or isolate malware-infected systems, Quantify the Denial of Service (DoS) attack and traffic, Research Audio/Visual (AV) vendor databases, Research current attack intelligence and recent vulnerabilities, Review Operating System (OS) and application logs, Review the output and status of antivirus software, Sandbox malware infected systems, and Update internal management team as appropriate (assessment).

Task list 29-3-1 for task type Respond 193-3 includes exemplary tasks 192 with the following names/titles: Apply type specific malware containment measures, Configure egress filters, Contact owners of systems being used to mount the Denial of Service (DoS) attack, and Contact your ISP.

Currently, task 192-2 is selected, indicated by reference 64-2. For each selected task (here, task 192-2), a task edit button 52-2 is displayed. The task edit button 52-2 enables incident responders 172 and/or security analysts 183 to edit the attributes 51 for each task 192 in response to selection of the task edit button 52-2. Of the selected task 192-2, the owner 51-2 is currently "J. Smythe," the due date is "n/a", and its actions 51-3 specify execution of a script or binary file "/bin/blockOutboundPorts.exe" to configure the egress (e.g. output ports) filters of the firewall 36 within the enterprise network 131 to stop the effects of the current DoS attack upon the devices in the enterprise network 131.

Figure 4C:
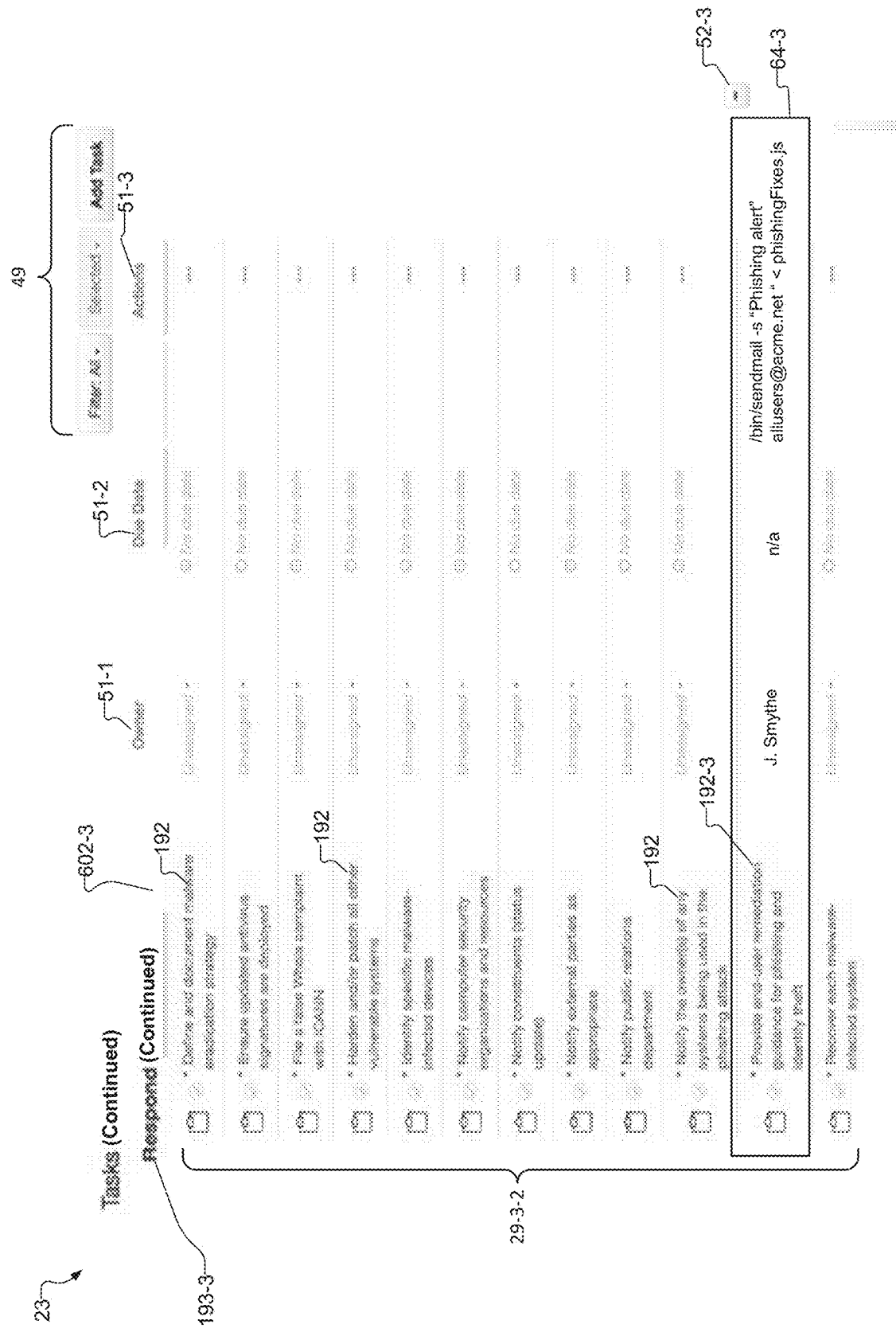

FIG. 4C displays screen 602-3 of task information. Screen 602-3 includes exemplary tasks of task type Respond 193-3, continued from FIG. 4B.

Task list 29-3-2 for task type Respond 193-3 includes exemplary tasks 192 with the following names/titles: Define and Document malware eradication strategy, Ensure updated antivirus signatures are deployed, File a false "whois" complaint with ICANN, Harden and/or patch all of the vulnerable systems, Identify specific malware-infected devices, Notify computer security organizations and resources, Notify constituents (status update), Notify external parties as appropriate, Notify public relations department, Notify the owners of any systems being used in the Phishing attack, Provide end-user remediation guidance for phishing and identity theft, and Recover each malware infected system.

Currently, task 192-3 is selected, indicated by reference 64-3. For each selected task (here, task 192-3), a task edit button 52-3 is displayed. The task edit button 52-3 enables incident responders 172 and/or security analysts 183 to edit the attributes 51 for each task 192 in response to selection of the task edit button 52-3. Of the selected task 192-3, the owner 51-2 is currently "J. Smythe," the due date is "n/a", and its actions 51-3 specify to send mail to all users at ACME Company. The subject of the email is "Phishing alert," and the contents of the email message is javascript file "phishingFixes.js," which cautions users about known phishing activity, tells users how to determine if their computer/user device 160 has been affected, and provides steps the users can take to quarantine their device if affected.

Figure 4D:
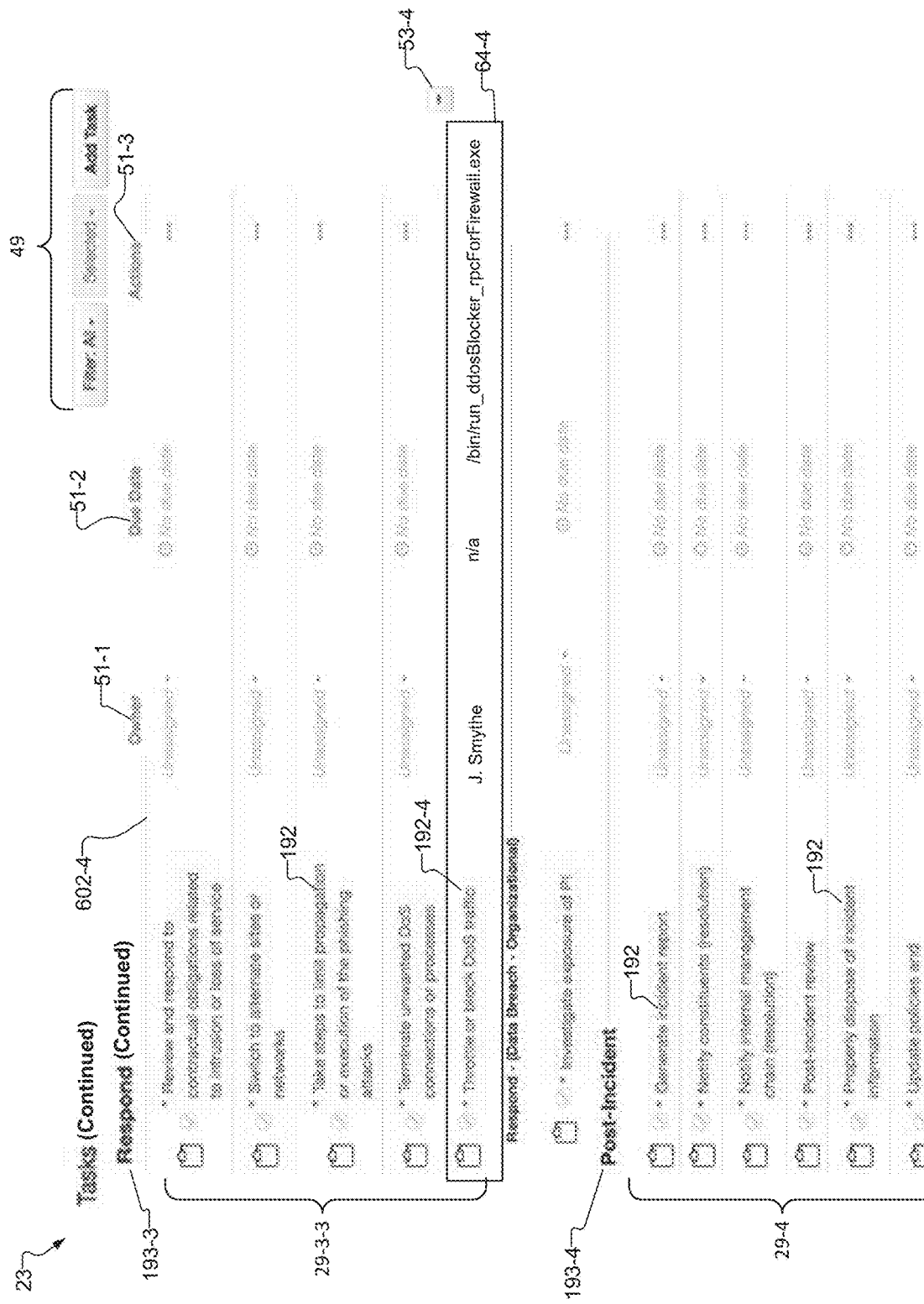

FIG. 4D displays screen 602-4 of task information. Screen 602-4 includes exemplary tasks of task type Respond 193-3, continued from FIG. 4C, and exemplary tasks of type Post-incident 193-4. Tasks of type Post-incident 193-4 are typically administrative in nature to document lessons learned when responding to incidents and to provide information concerning the tasks 192 and the incidents to groups throughout each business organization.

Task list 29-3-3 for task type Respond 193-3, continued from FIG. 4C, includes exemplary tasks 192 with the following names/titles: Review and respond to contractual obligations related to intrusion or loss of service, Switch to alternate sites or networks, Take steps to limit propagation or execution of the phishing attacks, Terminate unwanted DoS connections or processes, and Throttle or block DoS traffic.

Currently, task 192-4 is selected, indicated by reference 64-4. For each selected task (here, task 192-4), a task edit button 52-4 is displayed. The task edit button 52-4 enables incident responders 172 and/or security analysts 183 to edit the attributes 51 for each task 192 in response to selection of the task edit button 52-4. Of the selected task 192-4, the owner 51-2 is currently "J. Smythe," the due date is "n/a", and its actions 51-3 specify to execute file "run_ddosBlocker_rpcForFirewall.exe". In this example, the file specifies execution of a Remote Procedure Call (RPC) to the firewall 36, to block (e.g. filter) data traffic types of known Distributed Denial of Service (DDos) attacks.

Task list 29-4 for task type Post-Incident 193-4 includes exemplary tasks 192 with the following names/titles: Generate incident report, Notify constituents (resolution), Notify internal management chain (resolution), Post-incident review, Properly dispose of incident information, and Update policies and procedures.

Figure 5A:
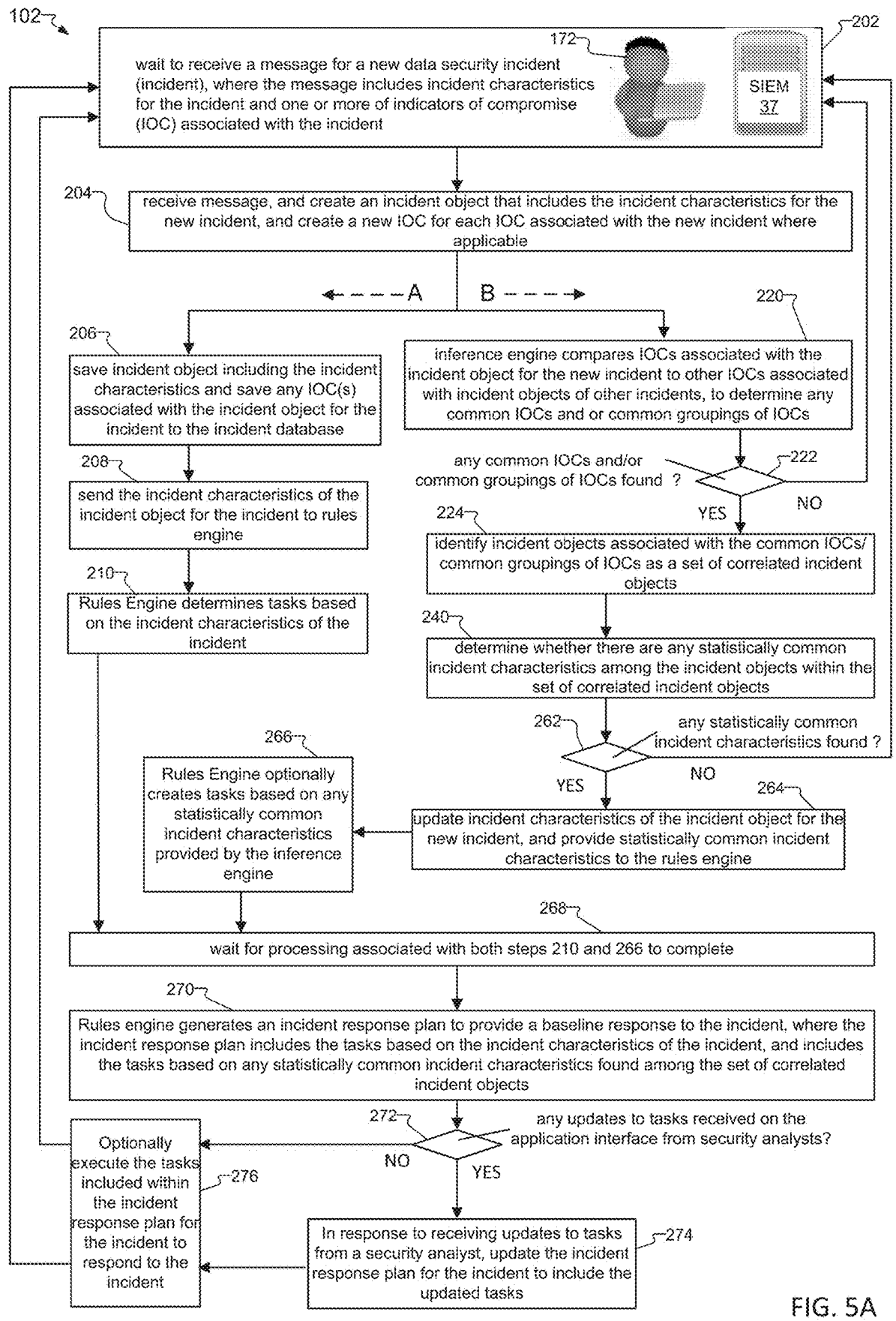
FIG. 5A is a flow diagram that shows how an IM generates an incident response plan for providing an incident response to a new data security incident, where the incident response plan includes tasks that the IM creates for responding to the data security incident, and where the tasks are based on incident characteristics of the incident and/or based on IOCs associated with the incident.

FIG. 5A is a flow diagram that shows how an IM 102 generates an incident response plan for providing an incident response to a new data security incident. In the description that follows for FIG. 5A below, by way of an example, different incident objects 41 and associated IOCs 120 in FIG. 3 are referenced to provide an example for how the IM 102 may process new incidents.

In step 202, the IM 102 waits to receive a message for a new data security incident (incident), where the message includes incident characteristics 20 for the incident and one or more of indicators of compromise (IOC) 120 associated with the incident. In one example, the message is sent to the IM 102 from a SIEM 37. For illustration purposes, the IM 102 has previously processed information for only one incident. By way of the example, with reference to FIG. 3, the information for the previous incident stored within the IM 102 is incident object 41-1 with associated IOCs 120-1, 120-2, and 120-3 for a "phishing" incident.

In step 204, the 102 receives the message for a new incident, creates an incident object 41 that includes the incident characteristics 20 for the new incident, and creates a new IOC 120 for each IOC associated with the incident, where applicable. The message includes information for a new "DDoS" incident. By way of the example and with reference to FIG. 3, incident object 41-2 is created for the new incident, and new IOC 120-4 associated with incident object 41-2 is created. Note that IOC 120-1 already exists in the incident database 122 and is now associated with both incident object 41-1 for the previous incident and new incident object 41-2 for the new incident.

Upon conclusion of step 204, the IM 102 processes the information for the incident according to two parallel paths of execution, labeled A and B. Note that at one point in the processing, both paths A and B traverse steps 268 and 270 as a common step. The method steps for path A are described first, followed by the steps for path B.

According to path A, in step 206, the IM 102 saves the incident object 41 including the incident characteristics 20 and saves any IOCs 120 associated with the incident object 41 for the incident to the incident database 122. In step 208, the IM 102 sends the incident characteristics 20 to its rules engine 178 for additional processing. The rules engine 178 then determines tasks 192 based on the incident characteristics 20 of the incident, in step 210. As a result of step 210, by way of the example and with reference to FIG. 3, the rules engine 178 creates tasks based on the incident characteristics 20-2 of new incident object 41-2.

Upon conclusion of step 210, the method transitions to step 268. In step 268, the method waits for processing associated with both steps 210 and 266 to complete before transitioning to step 270. Details for step 270 are provided within the description for the processing of path B, included herein below.

According to path B, in step 220, the inference engine 180 of the IM 102 compares IOCs 120 associated with the incident object 41 for the new incident to other IOCs 120 associated with incident objects 41 of other incidents, to determine any common IOCs 120 or common groupings of IOCs 120. By way of the example and with reference to FIG. 3, the inference engine 180 compares IOCs 120-2 and 120-4 for new incident object 41-2 to IOCs 120-1, 120-2, and 120-3 for existing incident object 41-1.

In step 222, the inference engine 180 determines whether any common IOCs 120 or common groupings of IOCs 120 were found. If no common IOCs/groupings of IOCs were found, the method transitions back to step 202 to wait for messages associated with other incidents. Otherwise, the method transitions to step 224. By way of the example and with reference to FIG. 3, IOC 120-2 is in common between the incident objects 41-1/41-2, in one example. This is because IP address "100.10.1.1" of IOC 120-2 is included within both the incident characteristics 20-1/20-2 of incident Objects 41-1/41-2.

Note that many other criterial fields between IOCs 120 can be related for the inference engine 180 to determine that the IOCs are in common and/or that groupings of the IOCs are in common. In one example, with reference to FIG. 3, IOC 120-3 and 120-5 currently have no criteria in common among them. However, if incident responders 172 determine that the same IOCs 120-3 and 120-5 are part of the same cyber attack, in one example, the incident responders 172 can create a logical association or grouping between the IOCs.

In step 224, the inference engine 180 identifies any incident objects 41 associated with the common IOCs/common groupings of IOCs as a set of correlated incident objects. By way of the example and with reference to FIG. 3, because IOC 120-2 was determined to be a common IOC, the set of correlated incident objects includes incident objects 41-1 and 41-2. Then, in step 240, the inference engine 180 determines whether there are any statistically common incident characteristics 20 among the incident objects within the set of correlated incident objects.

Figure 6:
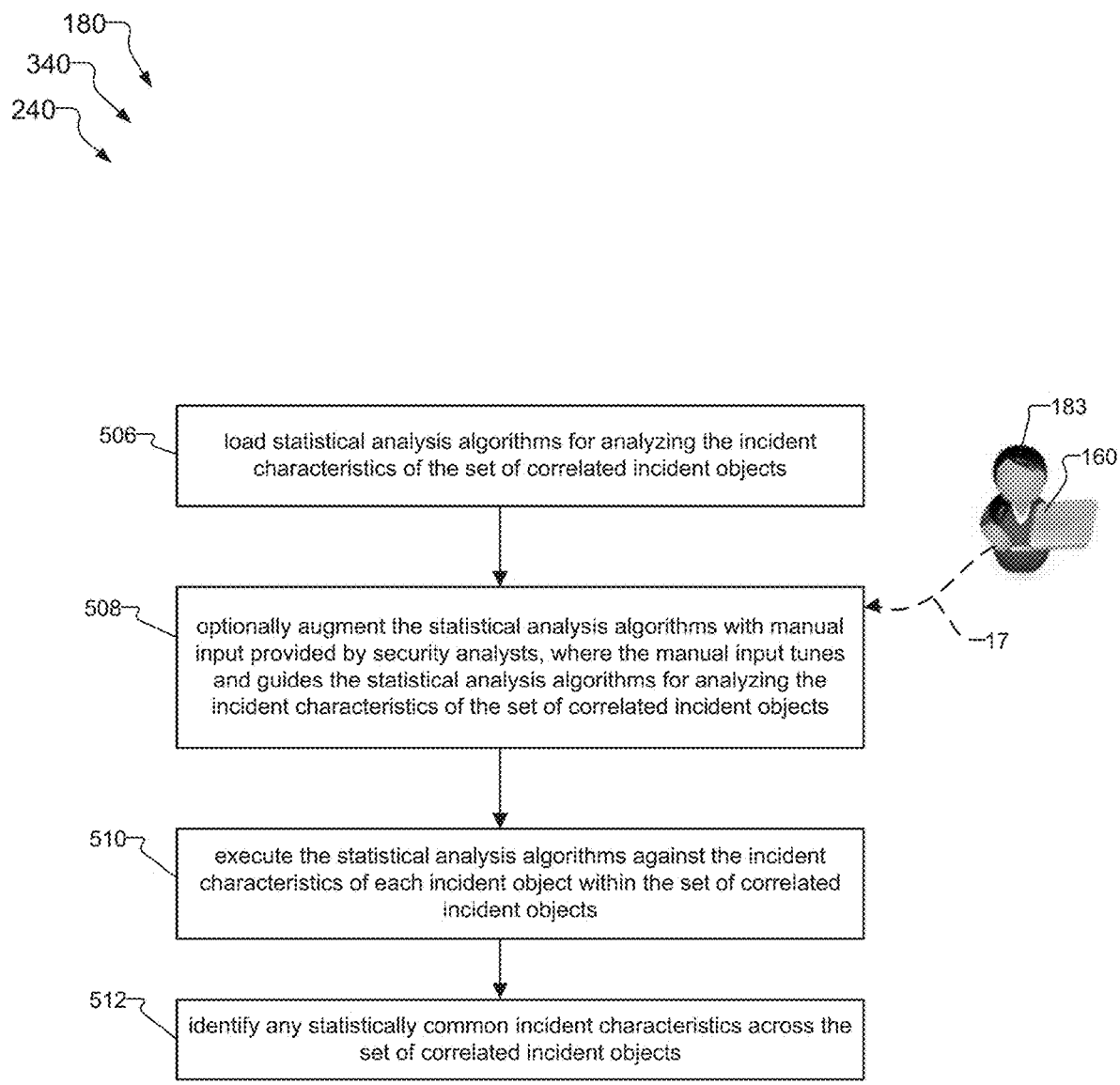
FIG. 6 provides more detail for the flow diagrams of FIGS. 5A and 5B.

FIG. 6 provides more detail for step 240 in FIG. 5A.

In step 506, the inference engine 180 loads statistical analysis algorithms 99 for analyzing the incident characteristics 20 of the incident objects 41 within the set of correlated incident objects. In step 508, the statistical analysis algorithms 99 are optionally augmented with manual input provided by security analysts 183, where the manual input tunes and guides the statistical analysis algorithms 99 for analyzing the incident characteristics 20 of the set of correlated incident objects.

Then, in step 510, the inference engine 180 executes the statistical analysis algorithms 99 against the incident characteristics 20 of each incident object 41 within the set of correlated incident objects, and identifies any statistically common incident characteristics 20 across the set of correlated incident objects in step 512. The description that follows below illustrates the effect that the method of FIG. 6 has upon the processing example that accompanies the steps of FIG. 5A presented thus far.

Upon the conclusion of step 512, by way of the example and with reference to FIG. 3, the incident objects 41-1 and 41-2 within the set of correlated incident objects may be related because of their common destination IP address, "100.10.1.1". However, the fact that the same device (here, the same destination IP address) is the target of two different attacks may be just a coincidence. By itself, this is likely not enough information to conclude that there is anything statistically meaningful in common between the incident characteristics 20-1 and 20-2. Correspondingly, there may not be anything in common between the incidents themselves. A much stronger indicator, in contrast, would be if the source IP address were the same among the incidents characteristics 20-1 and 20-2, which would suggest the same attacker/was responsible for both incidents.

The statistical analysis algorithms 99, in one example, can check for relatedness of incidents based on their time stamp. A time stamp for each incident is included within the incident characteristics 20 of the incident object 41 for each incident. If two or more incidents occurred substantially at the same time on the same day, or substantially at the same time over different days, the incidents could be related. By way of the example and with reference to FIG. 3, because the time stamp/incident time within the incident characteristics 20-1/20-1 differs by only one minute, the statistical analysis algorithms 99 may determine that the incidents are related. In response, the algorithms will then execute additional analysis upon the incident characteristics 20-1 and 20-2 (e.g. lookups of the source IP addresses in the incident characteristics 20-1 and 20-2 against an IP address "spoofing" TIS 130, in examples).

Returning to FIG. 5A, in step 262, if the inference engine 180 determines that no statistically common incident characteristics 20 were found among the set of correlated incident objects, the method transitions back to step 202. Otherwise, the method transitions to step 264.

In step 264, the inference engine 180 updates the incident characteristics 20 of the incident object 41 for the new incident, and provides the statistically common incident characteristics 20 to the rules engine 178. By way of the example and with reference to FIG. the inference engine 180 extracts the statistically common incident characteristics 20-1 and 20-2 from incident objects 41-1 and 41-2 and sends them to the rules engine 178.

In step 266, the rules engine 178 optionally creates tasks 192 based on any statistically common incident characteristics 20 provided by the inference engine 180. In step 268, because processing associated with both steps 210 and 268 have completed, the method transitions to step 270.

In step 270, the rules engine 178 generates an incident response plan 71 to provide a baseline response to the incident, where the incident response plan 71 includes the tasks based on the incident characteristics 20 of the incident, and includes the tasks based on any statistically common incident characteristics 20 found by the inference engine 180 among the set of correlated incident objects.

According to step 272, the IM 102 then determines whether any updates to tasks 192 have been received on the application interface 134. Typically, only security analysts 183 can provide this administrative function, which can potentially override or delete the current set of tasks 192 within the incident response plan 71 for the incident. If no updates to tasks were received, the method transitions to step 276. Otherwise, the method transitions to step 274.

In step 274, in response to receiving updates to tasks from a security analyst 183, the IM 102 updates the incident response plan 71 for the incident to include the updated tasks 192. In one example, in response to late-breaking information that a major data security incident was recently detected in enterprise networks 131 of five other companies in the same business sector as ACME Company, a security analyst 183 for ACME Company may inject a set of tasks to safeguard. ACME Company's enterprise network 131-1 against a likely imminent attack. For this purpose, in one example, the injected tasks specify to temporarily override all current tasks 192 in the incident response plan 71 for the current incident and that of other incidents, and to additionally disable all inbound ports on the firewall 36 of ACME Company's enterprise network 131-1. The method then transitions to step 276.

In step 276, the IM 102 optionally executes the tasks 192 included in the incident response plan 71 for the incident to respond to the incident. Specifically, the 102 can execute those tasks 192 having actions(s) 53-1 of an automated nature, such as tasks that specify execution of executable files and scripts that the IM 102 can access and invoke directly. These executable files and scripts, in turn, include instructions such as Remote Procedure Calls (RPCs) that act upon devices in the enterprise network 131 to provide a response to the incident. Examples of these "automated" tasks include tasks 192-2, 192-3, and 192-4 in FIG. 4B through 4D, respectfully.

Otherwise, tasks 192 that are more of an informational nature or require manual application and execution must be carried out by incident responders 172. An example of such a "manual" task is task 192-1 in FIG. 4A. However, even for these "manual" tasks 192, the IM 102 can generate a notification such as an email message or phone call to the owner 51-1 of the task, if configured, as a reminder for the owner 51-1 to perform the task 192 to provide a response to the incident.

Upon conclusion of step 276, the method transitions back to step 202 to wait for messages associated with other incidents.

Figure 5B:
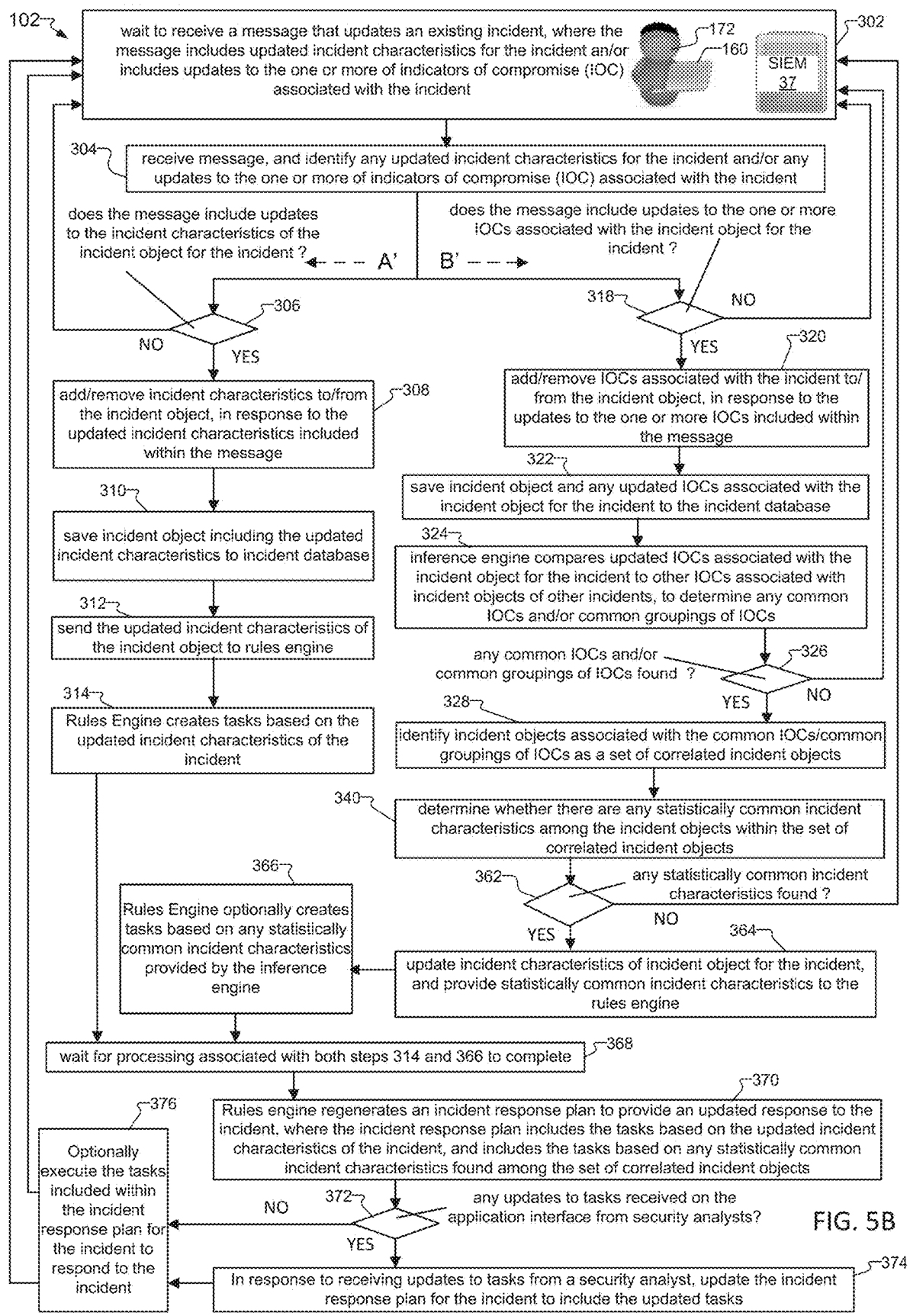
FIG. 5B is a flow diagram that shows how an IM regenerates an incident response plan to provide an updated incident response to an existing data security incident, where the regenerated incident response includes tasks that the IM creates for responding to the data security incident, and where the tasks are based on updates to incident characteristics of the incident and/or based on updates to IOCs associated with the incident.

FIG. 5B is a flow diagram that shows how an exemplary IM 102 can regenerate an incident response plan 71 in response to updates to incident characteristics 20 and/or updates to IOCs 120 associated with an existing incident. In the description that follows for FIG. 5B below, by way of example, different incident objects 41 and associated IOCs 120 in FIG. 3 are referenced to provide an example for how the IM 102 may process updates to existing incidents.

In step 302, the IM 102 waits to receive a message that updates an existing incident, where the message includes incident characteristics 20 for the incident and/or includes updates to one or more IOCs 120 associated with the incident. For illustration purposes, the IM 102 has previously processed information for two incidents. By way of the example and with reference to FIG. 3, the information for the previous incidents stored within the IM 102 includes incident object 41-1 and its associated IOCs 120-1, 120-2, and 120-3 for a "phishing" incident, and includes incident object 41-3 and its associated IOCs 120-1 and 120-5 for a "malware" incident.

In step 304, the IM 102 receives the message, and identifies any updated incident characteristics 20 for the incident and/or any updates to the one or more IOCs 120 associated with the incident. By way of the example and with reference to FIG. 3, the message is associated with updates to the existing "phishing" incident of incident object 41-1. The message includes an update to only IOC 120-2 associated with incident object 41-1, where the status of the IOC 120-2 has now been modified to "good" to indicate that the IOC 120-2 (e.g. IP address "100.10.1.1") is no longer considered to be a threat.

Upon conclusion of step 304, the IM 102 processes the updates for the incident according to two parallel paths of execution, labeled A' and B'. Note that at one point in the processing, both paths A' and B' traverse steps 368 and 370 as a common step. The method steps for path A' are described first, followed by the steps for path B'.

According to path A', in step 306, the TM 102 determines if the message includes any updates to the incident characteristics 20 of the incident object for the incident. If there are no updates, the method transitions back to step 302 to wait for updates to incidents. Otherwise, the method transitions to step 308.

In step 308, the IM 102 adds/removes any incident characteristics 20 to/from the incident object 41, in response to the updated incident characteristics 20 included within the message. In step 310, the IM 102 saves the incident object 41 including the updated incident characteristics 20 to the incident database 122. In step 312, the IM 102 sends the updated incident characteristics 20 of the incident object 41 to the rules engine 178. In step 314, the rules engine 178 creates tasks 192 based on the updated incident characteristics 20 of the incident.

Upon conclusion of step 314, the method transitions to step 368. In step 368, the method waits for processing associated with both steps 314 and 366 to complete before transitioning to step 370. Details for step 370 are provided within the description for the processing of path B', included herein below.

According to path B', in step 318, the IM 102 determines if the message includes any updates to the one or more IOCs 120 associated with the incident object 41 for the incident. If there are no updates identified, the method transitions back to step 302 to wait for updates to incidents. Otherwise, the method transitions to step 320.

In step 320, the IM 102 adds/removes any IOCs 120 associated with the incident to/from the incident object 41, in response to the updates to the one or more IOCs included within the message. By way of the example and with reference to FIG. 3, the IM 102 removes IOC 120-2 from the list of IOCs associated with incident object 41-1.

In step 322, the IM 102 saves the incident object 41 and any updates to IOCs associated with the incident object 41 for the incident to the incident database 122. In step 324, the inference engine 180 of the IM 102 compares the updated IOCs 120 associated with the incident object 41 for the incident to other IOCs 120 associated with incident objects 41 of other incidents, to determine any common IOCs 120 or common groupings of IOCs 120.

By way of the example and with reference to FIG. 3, the inference engine 180 in step 324 compares the updated associations between IOCs and incident object 41-1, namely IOCs 120-1 and 120-3, to IOCs 120-1 and 120-5 for incident object 41-3.

In step 326, the inference engine 180 determines whether any common IOCs 120 or common groupings of IOCs 120 were found. If no common IOCs/groupings of IOCs were found, the method transitions back to step 302 to wait for messages associated with other incidents. Otherwise, the method transitions to step 328. By way of the example and with reference to FIG. 3, IOC 120-1 is in common between the incident objects 41-1/41-3. This is because IP address "20.21.50.4" of IOC 120-1 is included within both the incident characteristics 20-1/20-3 of incident objects 41-1/41-3, in one example.

In step 328, the inference engine 180 identifies any incident objects 41 associated with the common IOCs/common groupings of IOCs as a set of correlated incident objects. By way of the example and with reference to FIG. 3, because IOC 120-1 was determined to be a common IOC, the set of correlated incident objects includes incident objects 41-1 and 41-3. Then, in step 340, the inference engine 180 determines whether there are any statistically common incident characteristics 20 among the incident objects 41 within the set of correlated incident objects.

FIG. 6 provides more detail for step 340 in FIG. 5B. Steps 506, 508, 510, and 512 are executed in a substantially similar fashion as previously provided in the description accompanying FIG. 5A step 240. The description that follows below illustrates the effect that the method of FIG. 6 has upon the processing example that accompanies the steps of FIG. 4B presented thus far.

Upon the conclusion of step 512 in FIG. 6, by way of the example and with reference to FIG. 3, the incident objects 41-1 and 41-3 within the set of correlated incident objects may be related because of their common source IP address, "20.21.50.4" in their incident characteristics 20-1/20-3. This strongly suggests that the same attacker was the source of the incidents. However, there can be other information that suggests the incident characteristics 20-1/20-3 are related.

The statistical analysis algorithms 99, in another example, can check for relatedness of incidents based on FQDN. Though the FQDN of incident object 41-1 is associated with a "known bad" domain name and the FQDN of incident object 41-3 is not, the statistical analysis algorithms 99 can determine that the FQDNs are related. Specifically, the FQDNs both include string "www.acme2.net." Because of this, the statistical analysis algorithms 99 could conclude that the public website of ACME Company itself may be compromised.

Returning to FIG. 5B, in step 362, if the inference engine 180 determines that no statistically common incident characteristics 20 were found among the set of correlated incident objects, the method transitions back to step 302. Otherwise, the method transitions to step 364.

In step 364, the IM 102 updates the incident characteristics 20 of the incident object for the new incident, and provides the statistically common incident characteristics 20 to the rules engine 178. By way of the example and with reference to FIG. 3, the inference engine 180 extracts the statistically common incident characteristics 20-1 and 20-3 from incident objects 41-1 and 41-3 and sends them to the rules engine 178.

In step 366, the rules engine 178 optionally creates tasks 192 based on any statistically common incident characteristics 20 provided by the inference engine 180. In step 368, because processing associated with both steps 314 and 366 have completed, the method transitions to step 370.

In step 370, the rules engine 178 regenerates an incident response plan 71 to provide an updated response to the incident, where the incident response plan 71 includes the tasks based on the updated incident characteristics 20 of the incident, and includes the tasks based on any statistically common incident characteristics 20 found by the inference engine 180 among the set of correlated incident objects.

According to step 372, the IM 102 then determines whether any updates to tasks 192 have been received on the application interface 134, typically from security analysts 183. If no updates to tasks were received, the method transitions to step 376. Otherwise, the method transitions to step 374.

In step 374, in response to receiving updates to tasks from a security analyst 183, the IM 102 updates the incident response plan 71 for the incident to include the updated tasks 192 provided by the security analyst 183. The method then transitions to step 376.

In step 376, the IM 102 optionally executes the tasks 192 included in the incident response plan 71 for the incident to respond to the incident. As in FIG. 5A step 276, the IM 102 can execute those tasks 192 having actions(s) 53-1 of an automated nature, and must defer execution of tasks 192 that are manual in nature to incident responders 171.

Upon conclusion of step 376, the method then transitions back to step 302 to wait for messages associated with other incidents.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for responding to data security incidents in an enterprise network, comprising:
    creating, in an incident manager (IM) application and in an automated manner, one or more incident objects for respective one or more data security incidents, wherein an incident object includes an incident characteristic;
    creating, in the IM application, one or more indicators of compromise (IOC), and linking the one or more indicators of compromise to the incident object;
    determining tasks for the incident object, wherein one or more tasks are determined for the incident object based upon the incident characteristic of the incident object, and one or more common IOCs or common groupings of IOCs associated with the incident object, wherein common IOCs or common groupings of IOCs are determined by comparing the IOCs associated with the incident object for a data security incident to IOCs associated with one or more incident objects for other data security incidents stored within the IM application;
    for a given data security incident, generating an incident response plan, wherein the incident response plan includes the tasks based upon the incident characteristic of the incident object associated with the given data security incident, and includes any tasks based upon the one or more common IOCs or common groupings of IOCs associated with the incident object;
    for the given data security incident, and responsive to a determination that a given IOC is no longer correlated with the given data security incident, de-associating the given IOC from the incident object by unlinking it from the incident object in an automated manner, and responsive to the unlinking, re-generating the incident response plan; and
    responsive to re-generating the incident response plan, programmatically initiate execution, in one or more computing entities in the enterprise network, of one or more tasks in the re-generated incident response plan to respond to the given data security incident.

2. The method of claim 1, wherein determining the tasks for the incident object based upon the one or more IOCs associated with the incident object comprises:
    identifying incident objects associated with the common IOCs or common groupings of IOCs as a set of correlated incident objects;
    determining whether there are any common incident characteristics among the set of correlated incident objects; and
    creating tasks based upon the common incident characteristics among the set of correlated incident objects.

3. The method of claim 2, wherein determining whether there are any common incident characteristics among the set of correlated incident objects comprises:
    loading a statistical analysis algorithm for analyzing the incident characteristics of the set of correlated incident objects; and executing the statistical analysis algorithm against the incident characteristics of the incident objects within the set of correlated incident objects.

4. The method of claim 1, further comprising:

sending a message to the IM application, the message having been generated by a Security Information and Event Manager (SIEM) of the enterprise network and including the incident characteristic of the incident object and the one or more IOCs associated with the incident object; and creating, by the IM application, the incident object, the incident characteristic of the incident object, and the one or more IOCs associated with the incident object in response to receiving the message.

5. A system for responding to data security incidents, the system comprising:

a hardware processor;

an incident manager (IM) application executed on the hardware processor that creates, in an automated manner, one or more incident objects for one or more respective data security incidents, wherein an incident object includes an incident characteristic, and that creates one or more indicators of compromise (IOC) and links them to the incident object; and a rules engine of the IM application that: creates one or more tasks for the incident object based upon the incident characteristic of the incident object; determines one or more tasks for the incident object based upon one or more common IOCs or common groupings of IOCs associated with the incident object, wherein common IOCs or common groupings of IOCs are determined by comparing the IOCs associated with the incident object for a data security incident to IOCs associated with one or more incident objects for other data security incidents stored within the IM application; and for a given data security incident generates an incident response plan, wherein the incident response plan for the given data security incident includes the tasks based upon the incident characteristic of the incident object associated with the given data security incident, and includes the tasks based upon the one or more common IOCs or common groupings of IOCs associated with the incident object;

wherein, responsive to a determination that a given IOC is no longer correlated with the given data security incident, the IM application de-associates the given IOC from the incident object by unlinking it from the incident object in an automated manner, and responsive to the unlinking, re-generates the incident response plan for the given data security incident; and wherein the rules engine is further configured responsive to re-generating the incident response plan to programmatically initiate execution, in one or more computing entities, of one or more tasks in the re-generated incident plan to respond to the given security incident.

6. The system of claim 5, wherein the IM application further comprises an inference engine that: identifies one or more incident objects associated with the common IOCs or common groupings of IOCs as a set of correlated incident objects; determines whether there are any common incident characteristics among the set of correlated incident objects; and sends the common incident characteristics to the rules engine, wherein the rules engine determines the tasks for each incident object based upon the one or more IOCs associated with each incident object in response to receiving the common incident characteristics from the inference engine.

7. The system of claim 5, wherein the IM application includes a statistical analysis algorithm, and wherein the inference engine downloads the statistical analysis algorithm from the IM application and applies the statistical analysis algorithm to the set of correlated incident objects to determine whether there are any common incident characteristics among the set of correlated incident objects.

8. The system of claim 5, further comprising a Security Information and Event Manager (SIEM) that includes the incident characteristics of the incident object and the one or more IOCs associated with the incident object within a message, and sends the message to the IM application, and wherein the IM application creates the incident object, the incident characteristic of the incident object, and the IOCs associated with the incident object in response to receiving the message.

9. The system of claim 5, wherein types of the IOCs associated with the incident object include Internet Protocol (IP) addresses, hashes associated with malware, domain names, names of files, user accounts, registry keys, email addresses, and/or protocol port numbers.

10. The system of claim 5, wherein the incident characteristic included within the incident object include an incident type, data compromise status information, data exposure status information, and time/date of incident occurrence.

11. The system of claim 5, wherein the IM application receives updates to the tasks from a security analyst, and updates the incident response plans for the data security incidents to include the updated tasks from the security analyst.

* * * * *